(12) United States Patent
Taylor

(10) Patent No.: US 8,808,489 B2
(45) Date of Patent: Aug. 19, 2014

(54) METHOD OF MANUFACTURING A FLEXIBLE, IMPACT-RESISTANT MATERIAL

(76) Inventor: David Stirling Taylor, Burnley (GB)

( * ) Notice: Subject to any disclaimer, the term of this patent is extended or adjusted under 35 U.S.C. 154(b) by 81 days.

(21) Appl. No.: 13/378,909

(22) PCT Filed: Jun. 2, 2010

(86) PCT No.: PCT/GB2010/001085
§ 371 (c)(1),
(2), (4) Date: Feb. 20, 2012

(87) PCT Pub. No.: WO2010/149945
PCT Pub. Date: Dec. 29, 2010

(65) Prior Publication Data
US 2012/0141750 A1    Jun. 7, 2012

(30) Foreign Application Priority Data

Jun. 23, 2009    (GB) .................................. 0910798.8

(51) Int. Cl.
| | | |
|---|---|---|
| B32B 38/04 | (2006.01) | |
| B32B 38/00 | (2006.01) | |
| F16F 1/373 | (2006.01) | |
| F16F 1/376 | (2006.01) | |
| F16F 3/087 | (2006.01) | |
| B32B 37/12 | (2006.01) | |
| A41D 31/00 | (2006.01) | |

(52) U.S. Cl.
CPC .......... B32B 38/0004 (2013.01); F16F 1/3737 (2013.01); F16F 1/376 (2013.01); F16F 3/0876 (2013.01); B32B 2305/02 (2013.01); B32B 2459/00 (2013.01); B32B 2037/1215 (2013.01); A41D 31/005 (2013.01)
USPC ............ 156/257; 156/268; 156/269; 156/270

(58) Field of Classification Search
USPC ................. 156/257, 268, 211, 247, 248, 270, 156/583.1, 308.2, 309.9, 513, 269
See application file for complete search history.

(56) References Cited

U.S. PATENT DOCUMENTS 2,752,279 A * 6/1956 Alderfer ....................... 428/133
3,285,768 A    11/1966 Habib
(Continued)

FOREIGN PATENT DOCUMENTS

WO        0103530 A1    1/2001
WO    2006036072 A1    4/2006
(Continued)

OTHER PUBLICATIONS

International Search Report for corresponding WIPO Publication No. PCT/GB2010/001085.

*Primary Examiner* — Linda L Gray
(74) *Attorney, Agent, or Firm* — Egbert Law Offices, PLLC

(57) ABSTRACT

A method of manufacturing a flexible, impact-resistant material (1) comprises the steps of providing a sheet of a closed-cell foam material (20) and cutting the sheet (20) into a plurality of spaced elements (2). These elements (2) are substantially separated except for connecting portions (7) that connect the elements to neighboring elements such that the elements (2) are joined to define a lattice (6). A first flexible substrate (3; 25) is bonded to one face of the lattice. The connecting portions (7) that connect the elements (2) to neighboring elements are then removed, either with or without removing those portions of the substrate (3) bonded to the connecting portions (7), for example by punching, cutting or laser ablation. A second flexible substrate (27) may be bonded to the opposite face of the lattice either before or after removal of the connecting portions.

17 Claims, 7 Drawing Sheets

(56) References Cited

U.S. PATENT DOCUMENTS

| | | | |
|---|---|---|---|
| 3,404,406 A * | 10/1968 | Balliet | 2/2.16 |
| 3,746,605 A * | 7/1973 | Dillon et al. | 428/159 |
| 3,775,526 A * | 11/1973 | Gilmore | 264/156 |
| 3,867,239 A * | 2/1975 | Alesi et al. | 428/48 |
| 4,241,457 A * | 12/1980 | Klein et al. | 2/2.5 |
| 4,538,301 A * | 9/1985 | Sawatzki et al. | 2/467 |
| 6,170,378 B1 * | 1/2001 | Neal et al. | 89/36.05 |
| 6,969,548 B1 * | 11/2005 | Goldfine | 428/159 |
| 7,067,031 B2 * | 6/2006 | deWitt | 156/250 |
| 7,793,579 B1 * | 9/2010 | Lee | 89/36.02 |
| 8,136,649 B2 * | 3/2012 | Burstrom | 193/25 E |

FOREIGN PATENT DOCUMENTS

| WO | WO2006036072 | * | 4/2006 |
|---|---|---|---|
| WO | 2006081403 A1 | | 8/2006 |

* cited by examiner

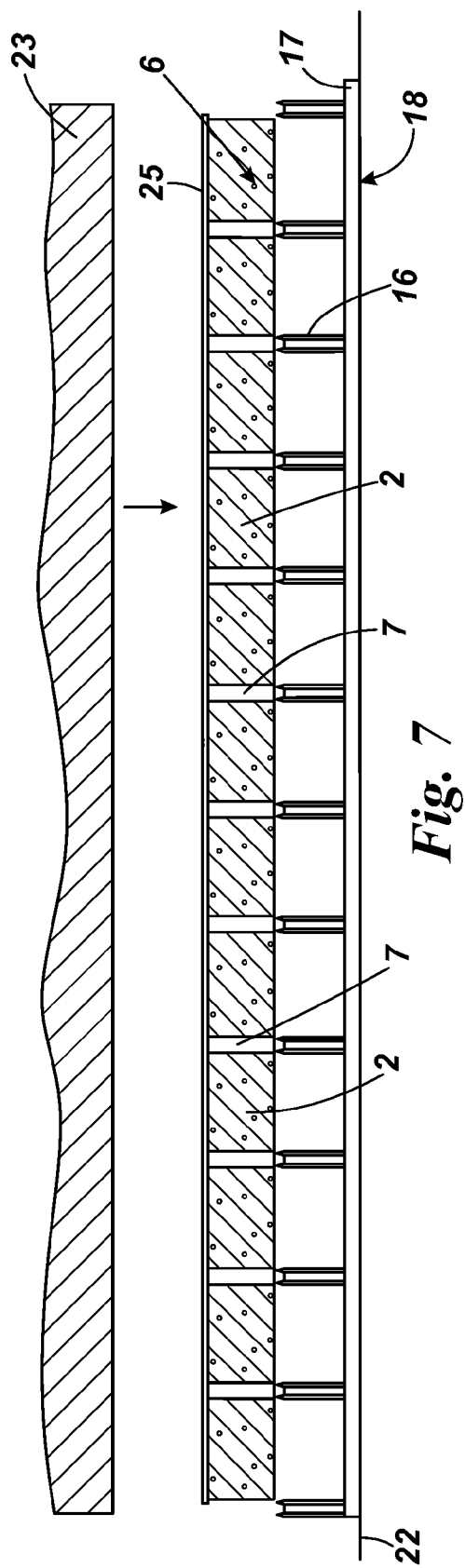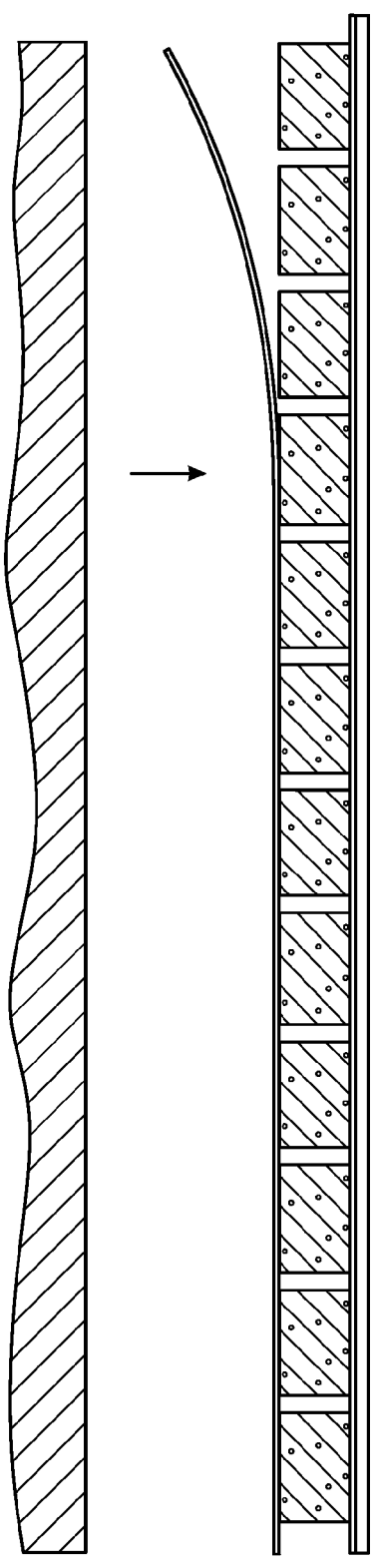

METHOD OF MANUFACTURING A FLEXIBLE, IMPACT-RESISTANT MATERIAL

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a method of manufacturing a flexible impact-resistant material, particularly but not exclusively flexible protective material for use in protective wear and footwear, and to the flexible impact-resistant material produced by this method.

2. Description of Related Art

Including Information Disclosed Under 37 CFR 1.97 and 37 CFR 1.98.

Protective, impact-resistant materials are currently used to produce clothing and protective articles to protect the person from knocks, abrasions and other injuries whilst playing sports and games, in particular in person to person contact sports such as American football and rugby and in equestrian sports. Occupations such as the building trade also use protective clothing to protect the person where there is a relatively high risk of injury.

Conventional protective wear may form an integral part of an item of clothing, for example a shoulder pad, or be provided separately, for example a shin pad. Protective insoles and shoe uppers may also be produced using flexible material. The flexible material produced by the method disclosed herein is suitable for use in all of these applications as well as for use in upholstery, luggage and in medical applications such as protective coverings for various parts of the body.

Some conventional protective materials take the form of a moulded foam article shaped to fit a particular part of the body. Such mouldings, however, have the disadvantage that they have to be produced in different sizes to fit different people. Provision of different sizes can be expensive or inconvenient. Also, closely fitting articles can restrict movement of the wearer, especially when worn on or near joints. A moulded foam article can only correctly fit a joint when in one position. When the joint moves, the article will no longer fit correctly. This may reduce the protection it affords.

Another existing material comprises a quilted material including lengths of foam sewn into pockets formed between two layers of fabric. Such materials are time consuming to produce. Also, such materials can generally only easily be flexed in a direction perpendicular to that of the strips of foam. Flexing the material in a direction along the length of the strips involves flexing the strips themselves which, depending on the type of foam used, can be difficult.

In WO 01/03530 is described a flexible material comprising a layer of closely spaced yet separate resilient elements joined to a flexible, resiliently stretchable substrate. Such a material overcomes the disadvantages of the materials described above and provides a flexible material that can confirm more easily to the body of the wearer than conventional materials as it is flexible in all three dimensions. It is therefore more comfortable to wear and can accommodate movement better than conventional materials. When used as a protective material or to form protective wear a single size, or a reduced number of sizes, can fit many differently sized bodies.

The method of manufacturing the material described in WO 01/03530 comprises the steps of
  providing a sheet of a resilient material;
  cutting the sheet into a plurality of spaced, separate elements using a cutter which is pressed into the sheet to cut therethrough;
  making one side of the spaced elements to stand proud of the surface of a jig provided to hold the elements in place; and
  bonding a flexible, resiliently stretchable substrate to one side of the separate elements by heating the substrate either to active an adhesive applied between said one side of the separate elements and the substrate or to weld the elements to the substrate.

The elements preferably take the form of blocks and whilst they can be of irregular shape, in most applications they are regular and typically, square, hexagonal or octagonal in cross-section. Again, whilst in some applications only a few large elements are required, in most applications there is a large number of elements that are evenly distributed on the substrate with a density of between 100 and 8000 elements/m$^2$, and most preferably with a density between 4000 and 6000/m2. For this reason, it is necessary to provide a jig that holds the elements in place while the substrate is bonded to them. Advantageously, the cutter is used to act as the jig and may be specially adapted by the provision of blocks or ejectors to make one side of the elements stand proud of the cutting edges of the cutter after cutting to enable this side of the elements to be bonded to the substrate.

BRIEF SUMMARY OF THE INVENTION

The object of the present invention is to provide an alternative method of manufacturing a material as described in WO 01/03530.

According to a first aspect of the present invention there is provided a method of manufacturing a flexible material comprising the steps of
  providing a sheet of a resilient material;
  cutting the sheet into a plurality of spaced elements that are substantially separated except for connecting portions that connect the elements to neighbouring elements such that the elements are joined to define a lattice;
  bonding one face of the lattice to a first flexible substrate; and
  removing or severing all or some of said connecting portions that connect the elements to neighbouring elements.

It will be appreciated that this method obviates the requirement for a jig as the elements are not separated until after the lattice comprising the elements have been bonded to the substrate, which then holds them in place. Prior to this, the lattice itself retains the elements in position relative to one another.

However, once the connecting portions have been severed or removed, the elements are separated and exhibit universal flexibility so that the material can flex in all directions without "locking up".

It will also be appreciated that in practice most of the connecting portions are either removed or severed but it is possible in some applications that a few of the connecting portions are left intact for location in areas where universal flexibility is not required.

Preferably, the connecting portions are removed along with those portions of the substrate to which the connecting portions are bonded. It will be appreciated that in this case the substrate defines connecting webs between the spaced elements that hold the structure together despite the fact that holes will be formed in the substrate in the areas where the connecting portions were bonded thereto.

The connecting portions and attached substrate may be severed or removed using any suitable means, for example by punching, by cutting or by ablation. Some of these means, for example laser ablation, may enable the connecting portions to be removed leaving the substrate to which the connecting portions were bonded intact. However, the provision of holes in the substrate can also be advantageous in some embodiments. In cases where the material is to be used in protective wear, the holes improve venting of the material, which allows the garments in which the material is incorporated to 'breathe' more efficiently. In embodiments where the substrate comprises a resiliently stretchable fabric, it may be possible to sever the connecting portions by simply stretching the substrate.

Preferably also, the method comprises the additional step of bonding a second flexible substrate to the opposite face of the lattice either before or after the connecting portions have been removed therefrom. In these embodiments, the provision of holes in the first or both substrates also improves venting, especially if one or both substrates are impervious to air or substantially so.

Preferably also, the substrate is bonded to the lattice by heating the substrate to activate an adhesive which has been applied between the substrate and the resilient material. Alternatively, the substrate is bonded to the lattice by fusing the resilient material and the substrate together using heat.

Preferably also, a cutter is used to cut the sheet into the lattice, the cutter comprising a plurality of cutter blades each with a polygonal or closed curve profile. The shape of the lattice is therefore defined by the region outside the closed profile cutters, the areas defined within the closed profiles of the cutter blades being waste.

Preferably also, a punch is used to remove the connecting portions that connect the elements to neighbouring elements, the punch comprising a plurality of polygonal or closed curve profile punch blades arranged so that their position corresponds to the positions of the connecting portions of the lattice.

Preferably also, the resilient material comprises a closed-cell foam.

Preferably also, the first and/or the second substrates comprise at least one of the following, namely a resiliently stretchable fabric, a knitted fabric, a woven fabric, a plastics sheeting.

The method may comprise a batch manufacturing process or a continuous manufacturing process. In the latter, lengths of the resilient material and the substrate are preferably fed between pairs of rollers that are adapted to cut the resilient material into a lattice, bond one face of the lattice to the substrate, and remove or sever all or some of said connecting portions that connect the elements to neighbouring elements within the lattice.

According to a second aspect of the present invention there is provided a flexible, impact-resistant laminate manufactured in accordance with the first aspect of the invention.

According to a third aspect of the present invention there is provided a flexible material comprising a layer of spaced, resilient elements having top and bottom surfaces, at least one of the surfaces of the elements being bonded to first substrate, holes being formed in the substrate at locations between the elements where connecting portions that connected the elements to neighbouring elements have been removed therefrom.

Other preferred but non-essential features of the various aspects of the invention are described in the dependent claims appended hereto.

BRIEF DESCRIPTION OF THE DRAWINGS

The various aspects of the present invention will now be described by way of example with reference to the accompanying drawings, in which:

FIGS. 5 to 8 are a series of diagrams showing in schematic vertical cross-section various stages during a batch manufacturing process of a flexible material in accordance with the method of the invention.

DETAILED DESCRIPTION OF THE INVENTION

Figure 1:
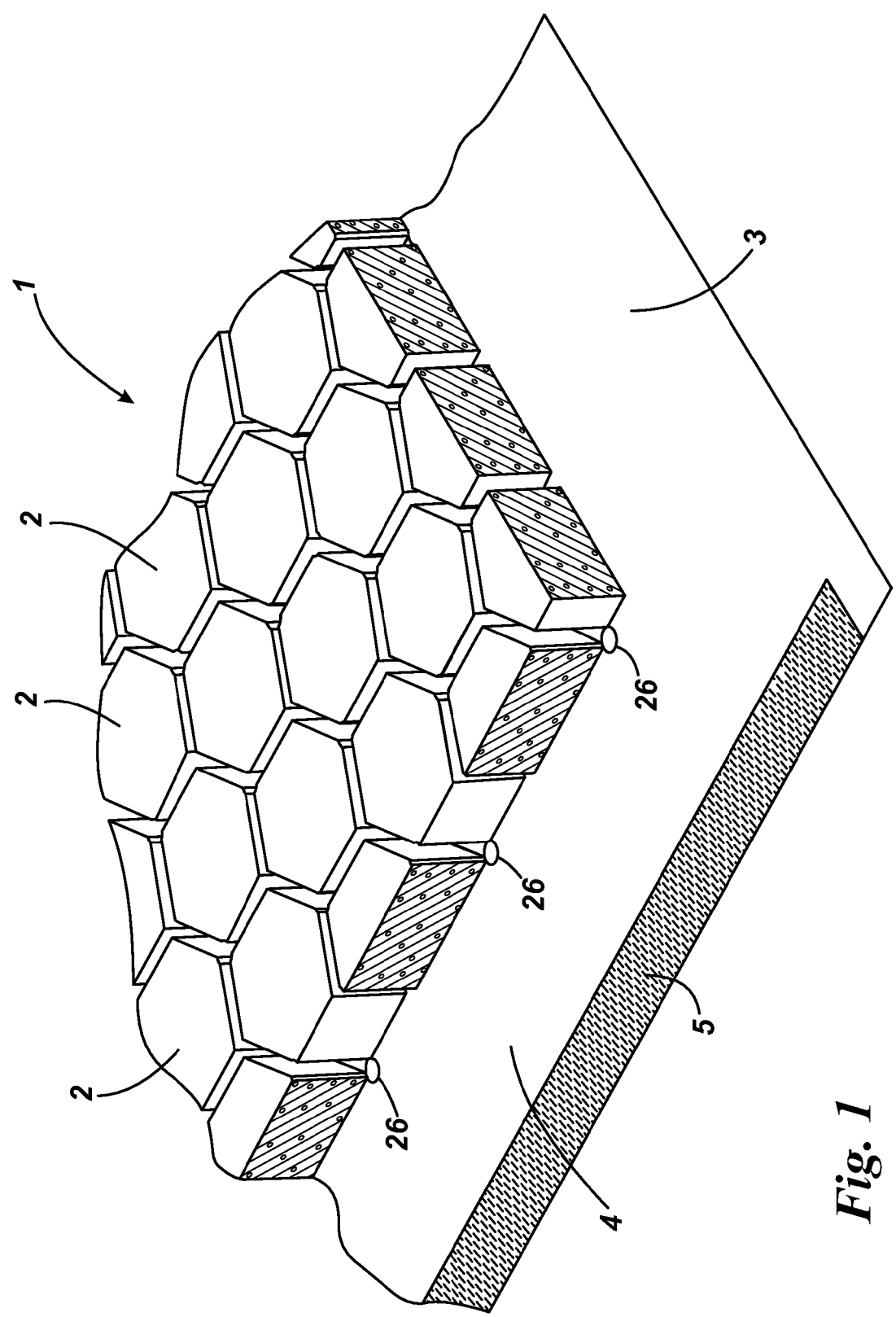
FIG. 1 is a perspective view of an embodiment of a flexible, impact-resistant laminate that has been manufactured in accordance with a method of the present invention.

As shown in FIG. 1, an example of a flexible, impact resistant material 1 manufactured according to the present invention comprises a plurality of elements 2 of a resilient closed-cell foam fused to or joined by an adhesive to a flexible substrate 3. The elements 2 are evenly arranged, each element 2 being spaced from its neighbouring elements 2 typically by between 1 mm and 4 mm.

In the embodiment illustrated, a margin 4 of the substrate 3 is provided around the periphery of the elements 2 and along the edges of the material at opposite ends respectively there are strips 5 of VELCRO (registered trade mark), only one of which is shown in FIG. 1, or other fastening means. These strips 5 can be used to join a piece of the material together, for example to form a wrist band or shin pad. Alternatively, the margins 4 of the substrate 3 can be sewn or otherwise secured to clothing parts or other materials dependent on the use to which it is to be put.

Advantageously, the closed-cell foam is a polyethylene foam and the elements 2 comprise cubes which are evenly distributed with a density of between 100 and 8000 cells or elements/$m^2$. For some applications, for example upholstery, the density can be lower than for protective wear as the greater the density, the greater the flexibility of the laminate. For protective wear a density between 2000 and 6000 elements/ m² is preferable as it allows the laminate to flex easily in all directions without "locking up" or preventing movement in a particular direction. Also, it enables the material 1 to be cut into small pieces, for example to form protective wear of different sizes, without significantly affecting its ability to flex.

Although the elements 2 in FIG. 1 have a hexagonal cross-sectional shape, the foam can be cut into other shapes, for example squares, rectangles, circles as appropriate for the particular application.

If the material 1 is to be used in the production of protective wear or upholstery, the substrate 3 is preferably made of a resiliently stretchable knitted fabric, advantageously one comprising polyester or elastane fibres. However, in other applications, the substrate 3 can be made of a hard-wearing knitted or woven fabric or film that does not need to be stretchable. Suitable films include plastics films such as sheets of polyethylene or polyurethane.

In some applications, a second flexible substrate layer is bonded over the elements 2 so that they are sandwiched between two substrate layers. In this case, if the first substrate 3 is resiliently stretchable or elastic, this helps to prevent puckering of one side of the material when it is flexed. Advantageously, however, both the outer substrate layers are resiliently stretchable. In cases where only a single stretchable substrate layer is provided and the laminate is to be used in a curved configuration, for example in protective clothing, the material is preferably arranged so that the stretchable layer lies on the outside surface of the curve.

Figure 2:
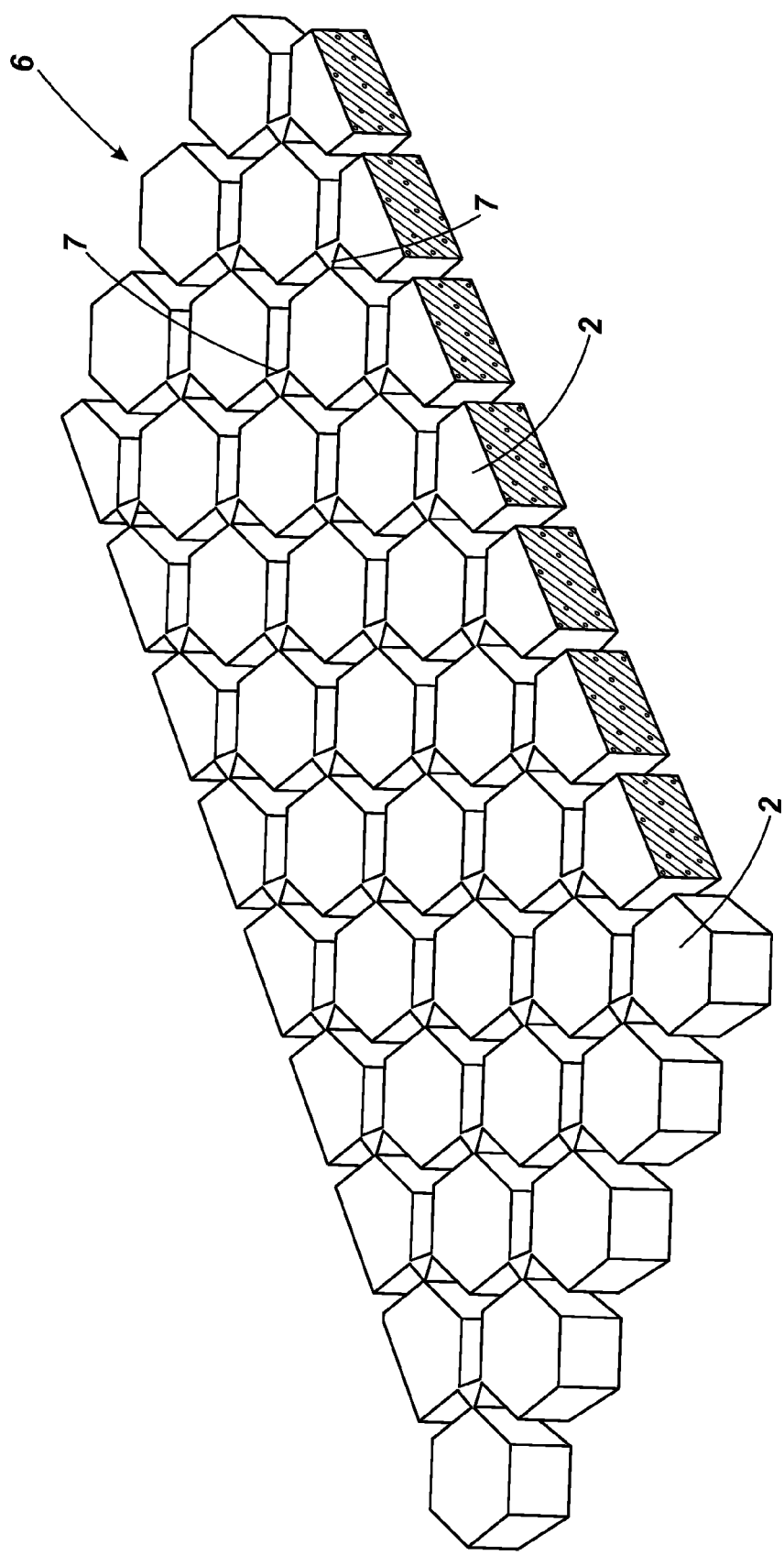
FIG. 2 is a perspective view of a sheet of closed-cell foam cut into a lattice in accordance with a method of the present invention.
Figure 3:
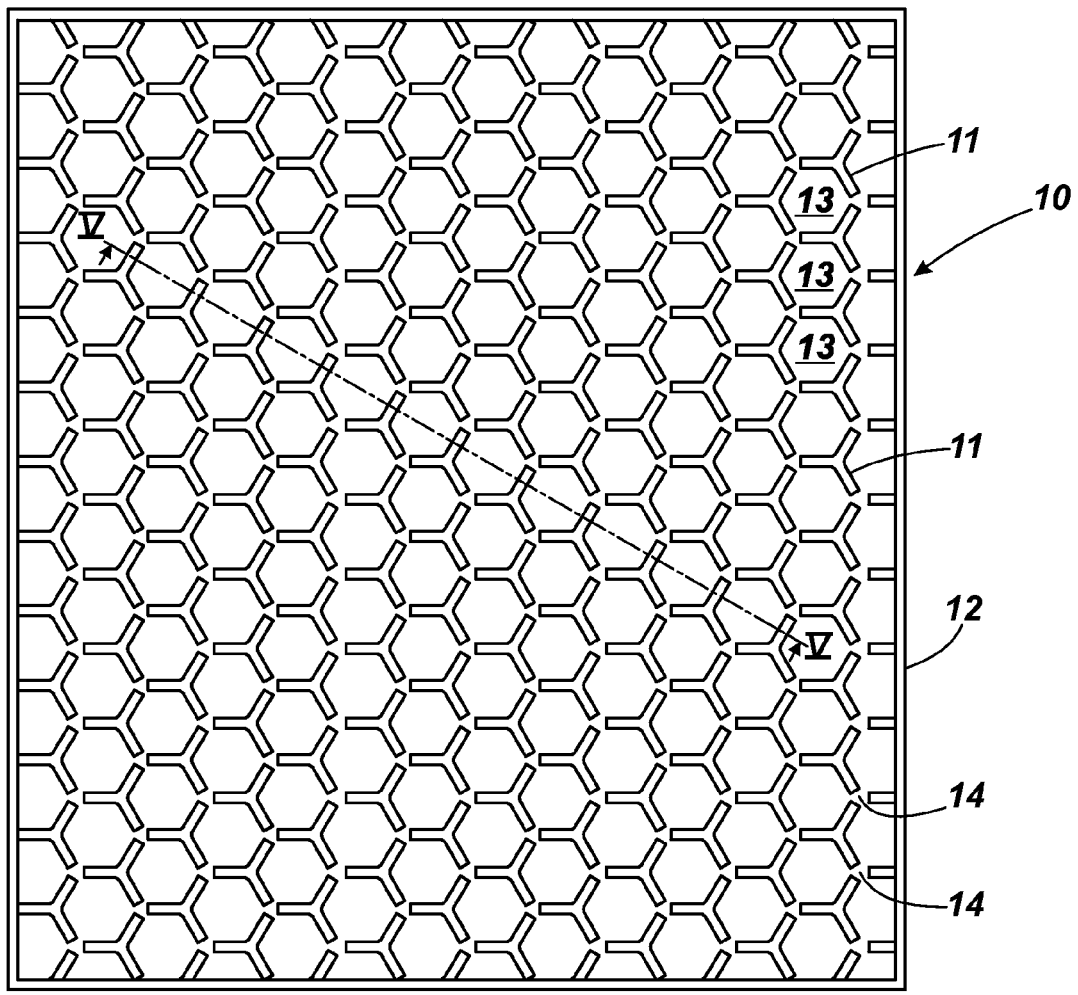
FIG. 3 is a plan view of a cutter for use in a method according to the present invention.

FIG. 3 shows a plan view of an embodiment of cutter 10 for use in a batch manufacturing process of the material 1 shown in FIG. 1. The cutter 10 comprises a plurality of blades 11, each with a polygonal or closed curve profile, that are mounted on a board 12. In this example the blades 11 are define polygonal Y-shapes, with 120° between each leg of the 'Y'. In this way the blades 11 can be arranged to define a tessellating pattern of regular hexagons 13 therebetween. Small, substantially triangular gaps 14 are left between adjacent blades 11 that are located at alternate angles around the periphery of the hexagons 13. It will therefore be appreciated that when the cutter 10 is used to cut through a sheet of resilient material such as a closed-cell foam the result will be the production of a lattice 6, as shown in FIG. 2. The lattice 6 is made up of a plurality of hexagonal elements 2 that are both spaced and separated from one another except for connecting portions 7 that are formed by the gaps 14 of the cutter 10. Each connecting portion 7 is substantially triangular and connects one of the elements 2 to two adjacent neighbouring elements 2. In this way the lattice 6 can be removed in one piece from the cutter 10, leaving behind Y-shaped waste pieces lodged within the Y-shaped blades 11.

It will be appreciated that the blades 11 can be made in different shapes to define different patterns of lattice. In all cases, however, narrow connecting portions or 'isthmuses' should be left to connect each element 2 cut out by the blades to one or more neighbouring elements. As indicated above, the shape of the lattice is therefore defined by the regions between the closed profile cutters, the area defined between within the cutter blades comprising waste material. This is in contrast to the prior art, in particular to the method described in WO 01/03530, where the elements are defined by the spaces within the polygonal or closed curve cutter blades and the lattice between the blades is waste.

Figure 4:
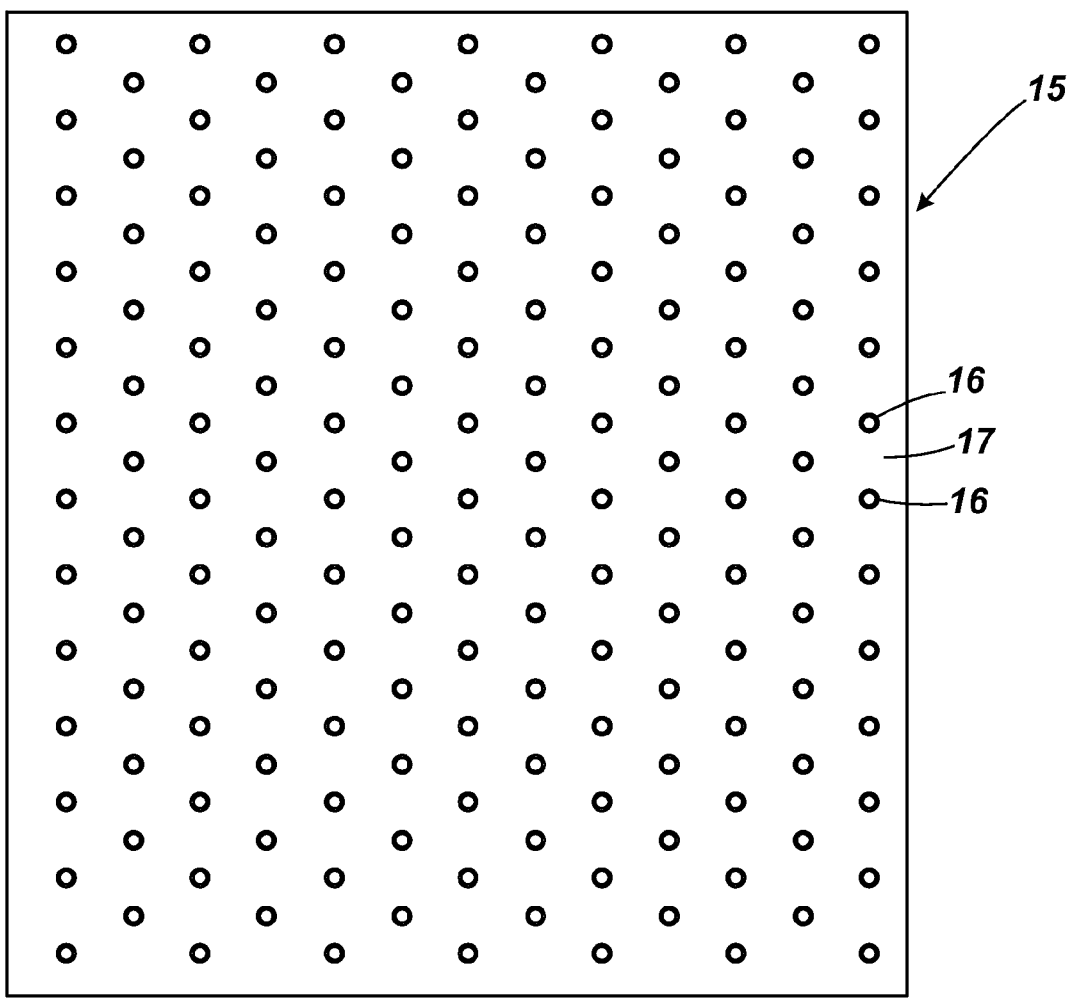
FIG. 4 is a plan view of a punch for use in a method according to the present invention.

FIG. 4 is a plan view of a punch 15 for use in conjunction with the cutter 10 shown in FIG. 3. The punch 15 comprises a series of polygonal or closed curve profile punch blades 16, which in this example are circular, that are mounted on a board 17. The board 17 is the same size as the board 12 of the cutter in order that the punch 15 can be located in the same or a similar mounting as the cutter 10. The cross-sectional area of the circular blades 16 is commensurate with the area of the triangular gaps 14 between the blades 11 of the cutter 10. In addition, the punch blades 16 are arranged in a regular pattern and spaced so that their position corresponds to the position of the gaps 14 in cutter 10. Hence, if the punch 15 is used after the cutter 10, it can be used to remove the connecting portions 7 joining neighbouring elements 2 of the lattice together.

Figure 5:
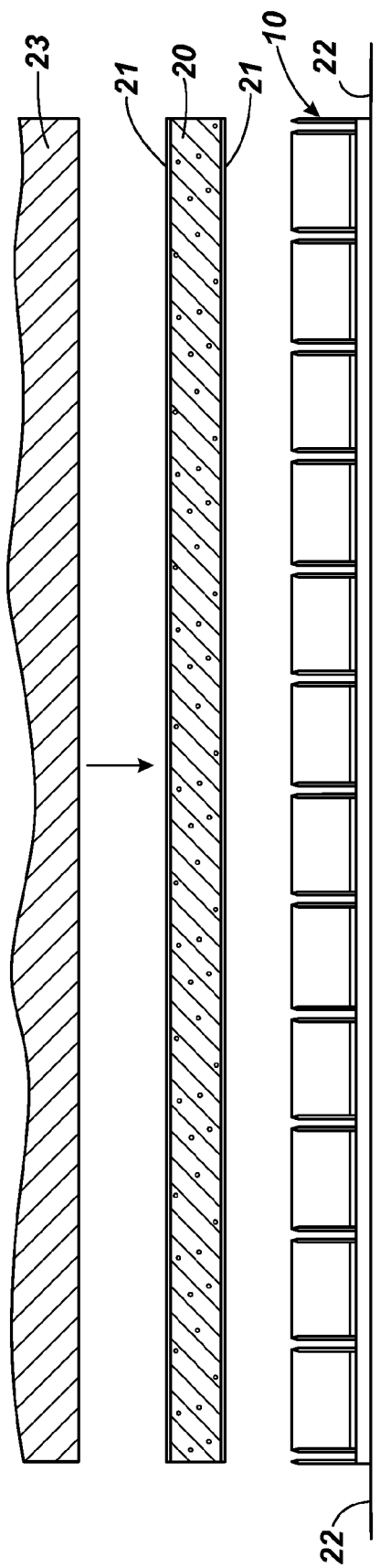

The steps involved in a batch manufacturing process of a material such as is shown in FIG. 1 using the cutter 10 and the punch 15 shown in FIGS. 3 and 4 will now be described with reference to the sequence of drawings as shown in FIGS. 5 to 8, the cross-section of the cutter shown in FIG. 5 being taken along the line V-V in FIG. 3. Such a batch manufacturing process produces discrete pieces of flexible material which can then be used in the manufacture of protective wear, upholstery and the like as previously described.

First, one or both faces of a sheet 20 of closed cell foam are coated with a hot melt adhesive 21. Both faces are shown coated in FIG. 5 so that a substrate can be bonded to both faces, as described below. The cutter 10 is located on a work surface 22 and the foam sheet 20 is laid on its upper face. A press 23 is then used to press the sheet 20 down into the cutter 10 so that the cutter blades 11 cut through the sheet 20 to form a cellular lattice 6 as shown in FIG. 2. Ejectors may be located within the cutter blades 11 so that on retraction of the press 23, the Y-shaped waste pieces located within the blades 11 are raised to stand proud of the lattice 6. These pieces are then easy to remove by hand or by a wiper than sweeps them away from the lattice 6. The lattice 6 can then be pulled off the cutter 10.

Figure 6:
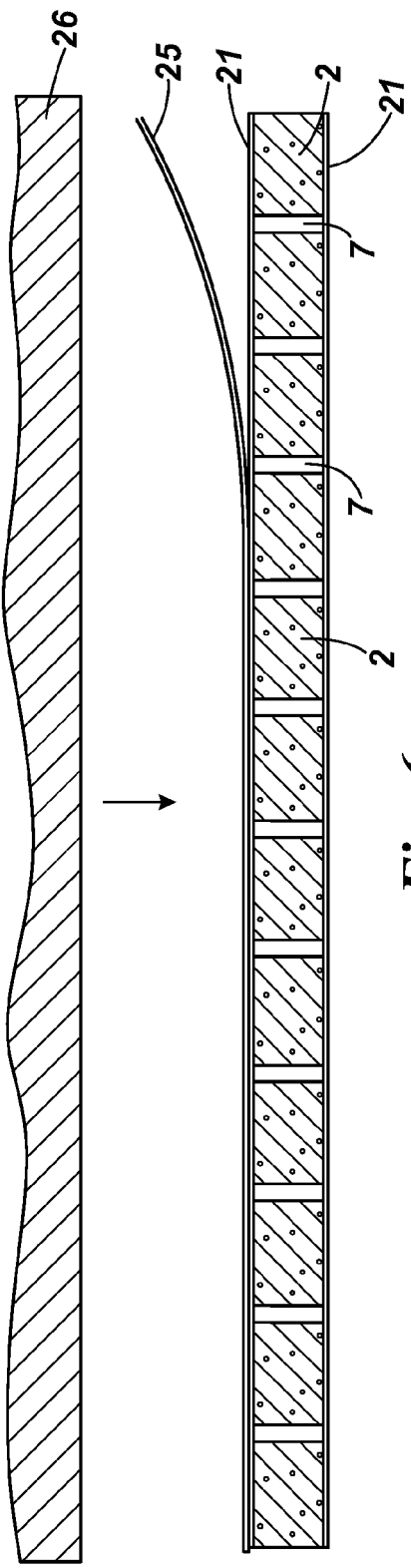

Next, as shown in FIG. 6, a first layer of a flexible substrate 25 is placed over the lattice 6. This substrate 25 will form the substrate labelled 3 in FIG. 1. A heated platen 26 is brought into contact with outer surface of the substrate 25 so that heat is conducted through the substrate 25 to the foam lattice 6. The heat activates the adhesive coating 21 to bond the substrate 25 to the upper face of the lattice 6.

The punch 15 is then located on the same or a similar work surface 22 and the lattice 6 and substrate bonded thereto are laid over it, as shown in FIG. 7. Correct registration of the lattice 6 with the punch 15 is important and various means can be used to achieve this. One means is to leave the off-cut foam around the periphery of the lattice 6 in place when it is removed from the cutter 10. As the back boards of the cutter 10 and the punch 15 are the same size, this off-cut foam can then be located around the periphery of the punch 15. The lattice 6 and substrate 25 are then pressed down on to the punch 15 using the same or a similar press 23 as previously so that the circular punch blades 16 are punched through both the lattice 6 and the substrate 25. As the punch 15 is made to complement the cutter 10 and the lattice 6 and the punch 15 are in register with one another, the punch blades 16 punch out the connecting portions 7 of the lattice and those portions of the substrate 25 bonded thereto to leave circular holes 26 in the substrate 25, as can be seen in FIG. 1. The now separated elements 2 are, however, held in place by the connecting webs of the substrate 25 between the elements 2.

If a second substrate layer 27 is to be bonded to the opposite face of the elements 2, the material should be turned over and the substrate 27 located over the elements 2. The heated platen 26 can then be used again to activate the adhesive coating 21 applied to this face, as shown in FIG. 8, to cause the substrate 27 to bond to the elements 2.

Variations to the above method are possible. It is possible, for example, to combine the cutter 10 with the punch 15 by making holes in the board 12 of the cutter 10 within the Y-shaped blades 11 so that the punch blades 16 can punch through them. In this case, the punch 15 would be located beneath the cutter 10 in a retracted position during cutting of the lattice 6. Then the Y-shaped waste pieces can be ejected using ejectors that push the Y-shaped waste pieces out of the lattice 6. Once these have been removed, the lattice 6 can be left within the cutter 10 and bonding of the substrate 25 to its upper face can then take place while it is still held by the cutter 10. For this to take place, the upper surface of the lattice 6 must lie either flush with the uppers edges of the cutter blades 11 or, preferably, project slightly above them. This can be achieved by the location of blocks 28 in the hexagonal areas of the cutter 10, as shown in FIG. 5. Alternatively, the height of the cutter blades 11 can be made slightly smaller than the thickness of the foam sheet 20 forming the lattice 6 so that the foam resiles after cutting, during which it is compressed, to stand proud or project above the upper edges of the cutter blades 11. Thereafter, by punching the punch blades 16 upwards through the holes in the board 12 of the cutter, the connecting portions 7 and those portions of the substrate 25 bonded to the connecting portions 7 can be removed.

Other variations can be adopted.

First, dependent on the nature of the substrate 25, it can be advantageous to coat the substrate 25 with the adhesive 21 rather than the sheet 20 of foam. The reason for this is that the adhesive seals the substrate around the region of the holes 26 and prevents it from fraying after cutting.

In some methods, the punch 15 can be replaced by another means of removing the connecting portions 7. Such means may or may not also remove those portions of the substrate 25 attached to the portions 7. For example, a cutter, such as a hot knife or a laser cutter, can be used in place of the punch 15 and used to cut through the foam and substrate to remove the connecting portions 7. Alternatively, burning or ablation can be use to remove the foam comprising the connecting portions 7 leaving the underlying substrate intact. Laser ablation is particularly suitable for such a process.

In some embodiments the closed-cell foam may be fused to the substrate layers 25 and 27 by the application of heat so that it partially melts on the surface rather than being adhered thereto. Neither the foam sheet 20 nor the substrate layers 25, 27 then need to be coated with the adhesive layers 21. Alternatively, a hot-melt film can be interposed between the lattice 6 and the substrates 25 and 27.

In other applications, removal of the connecting portions 7 takes place after the bonding of the second substrate 27 thereto. Such a procedure, for example by punches, by cutters, including cutting rollers, or by ablation may leaves holes through at least one of the substrate layers 25, 27 but not necessarily through the other. It is also possible for some of the connecting portions 7 to be removed by punching or by cutting through one of the substrates and for the others to be removed by punching or cutting through the other of the substrates. This will leave holes on both sides of the material, which can be advantageous in some applications where venting is important.

Figure 9:
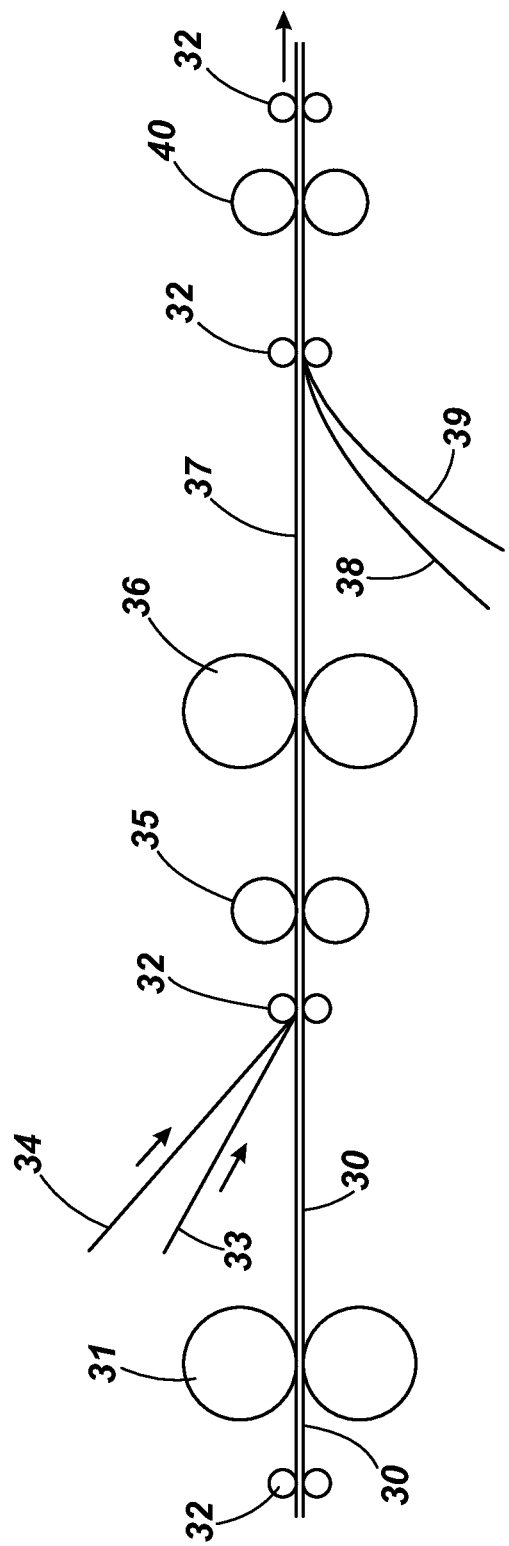
FIG. 9 is a diagram showing schematically a continuous manufacturing process of a flexible material in accordance with the method of the invention.

A continuous manufacturing process of a flexible material in accordance with the method of the invention will now be described with reference to FIG. 9. In this method, lengths of resilient material and substrate are fed between pairs of rollers of various kinds, as described below to produce a long length of flexible material rather than a discrete piece. This length can then be cut into appropriately sized pieces for use as required.

First, a continuous length of resilient material 30, such as the closed-cell polyethylene foam is fed between a pair of cutting rollers 31 using pairs of feed rollers 32, which are used through out the process to progress the material from stage to stage. The cutting rollers 31 comprise cutter blades with a polygonal or closed curve profile similar to those described above except that they are arranged around the circumference of the rollers or one of the rollers, the other providing a surface against which the cutter of the first roller bear. The cutter blades cut out the Y-shaped waste pieces 24 from the material 30 and remove it from the material 30 which now continues to the next stages of the process as a lattice similar to that shown in FIG. 2.

Next, a hot melt film 33 and a first substrate 34, such as is described above, are located adjacent one face of the material and bonded thereto using heated nip rollers 35, which act in the same way as the heated platen 26 and activate the film 33 to bond the substrate 34 to the material 30. In a variation, the hot melt film 33 can be omitted and either the material 30 fused to the substrate 34 or one or other of these can be coated with a hot melt adhesive using appropriate application rollers or brushes. Thereafter, the material is fed between a pair of rollers 36 which are adapted to act in a similar way as the punch 15 to remove the connecting portions 7 of the lattice. The cutters 36 could comprise heated spikes or similar that pierce the substrate 34 and melt the underlying connecting portions 7 of the lattice. Alternatively, the cutters 36 could comprise punch blades or similar. However, the rollers 36 are set up, it will be appreciated that they are adapted to complement the cutting rollers 31 and set up to operate in register with them so that only the connecting portions 7 are removed or severed and elements 2 are left intact.

The material 37 issuing from the rollers 36 resembles that shown in FIG. 1 and is ready for use. However, if it is desired to bond a substrate to the other face of the material 30, then second lengths of a hot melt film 38 and a substrate 39 can again be located adjacent the opposite face of the material 30 and bonded thereto using heated nip rollers 40. Again, the hot melt film 38 can be omitted and either the material 30 fused to the substrate 39 or one or other of these can be coated with a hot melt adhesive using appropriate application rollers or brushes. The resulting material is then similar to that produced by the batch process described above except that it can be produced in longer lengths.

It will be appreciated that it is also possible to use a combination of the two process. For example nip rollers could be used to apply the second substrate layer 27 to the foam in the batch method as it no longer necessary to locate the material in register with the punch 15 or other equivalent means for severing or removal of the connecting portions 7.

In all cases the elements 2 may be substantially identical or of different sizes and shapes as required for the use to which the finished material is to be put.

I claim:

1. A method of manufacturing a flexible material, the method comprising:
   providing a sheet of resilient material;
   cutting the sheet into a plurality of spaced elements that are substantially separated except for connecting portions that connect the spaced elements to neighboring elements such that the spaced elements are joined to define a lattice;
   bonding one face of the lattice to a first flexible substrate; and
   removing or severing at least some of said connecting portions that connect the spaced elements to neighboring elements after the lattice has been bonded to the first flexible substrate to produce a flexible material having a first flexible substrate to which a plurality of spaced and separate elements is bonded.

2. The method of claim 1, wherein the connecting portions are removed along with those portions of the first flexible substrate to which the connecting portions are bonded.

3. The method of claim 1, wherein the connecting portions are removed leaving the first flexible substrate intact.

4. The of method claim 2, wherein the connecting portions are removed by punching or by being cut away or by burning or by ablation.

5. The method of claim 1, comprising:
bonding a second flexible substrate to an opposite face of the lattice either before or after the connecting portions have been removed or severed therefrom.

6. The method of claim 1, the step of cutting comprising:
using a cutter to cut the sheet into the lattice, the cutter having a plurality of blades each with a polygonal or closed curve profile.

7. The method of claim 1, the step of removing or severing comprising:
using a punch to remove the connecting portions, the punch having a plurality of polygonal or closed curve profile punch blades arranged so that a position of the blade corresponds to the positions of the connecting portions of the lattice.

8. The method of claim 1, the step of bonding comprising:
heating the first flexible substrate to activate an adhesive which has been applied between the substrate and the sheet.

9. The method of claim 1, further comprising:
coating at least one face of the sheet with a hot-melt adhesive prior to the step of cutting.

10. The method of claim 1, further comprising:
coating one face of the first flexible substrate with a hot-melt adhesive prior to the step of bonding.

11. The method of claim 1, the step of bonding comprising:
bonding the first flexible substrate to the lattice by fusing the sheet and the first flexible substrate together using heat.

12. The method of claim 1, further comprising:
applying heat to the first flexible substrate and to the sheet to bond them together by using a heated platen.

13. The method of claim 1, the step of bonding comprising:
heating the first flexible substrate by passing the first flexible substrate and the lattice between heated nip rollers.

14. The method of claim 1, the step of cutting comprising feeding a length of the sheet and a length of the first flexible substrate between a pair of rollers that are adapted to cut the sheet into the lattice.

15. The method of claim 1, wherein the sheet of the resilient material comprises a closed-cell foam.

16. The method of claim 1, wherein the first flexible substrate is selected from at least one of a resiliently stretchable fabric, a knitted fabric, a woven fabric, and a plastic sheeting.

17. The method of claim 1, wherein the elements have a density of between 100 and 800 cells or blocks/$m^2$ within the lattice.

* * * * *